United States Patent
Jensen et al.

(10) Patent No.: US 6,201,847 B1
(45) Date of Patent: Mar. 13, 2001

(54) CORE SPRAY UPPER T-BOX TO REACTOR VESSEL ATTACHMENT

(75) Inventors: Grant Clark Jensen, Morgan Hill; David B. Drendel, San Jose, both of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/176,868

(22) Filed: Oct. 22, 1998

(51) Int. Cl.[7] .............................. G21C 15/00; G21C 19/00
(52) U.S. Cl. ..................... 376/352; 376/204; 376/282; 376/292; 138/89; 138/97
(58) Field of Search ..................... 376/352, 282, 376/364, 362, 178, 203, 204, 291, 292; 138/89, 97

(56) References Cited

U.S. PATENT DOCUMENTS

| | | | |
|---|---|---|---|
| 3,138,534 | * 6/1964 | Frisch et al. | 376/352 |
| 3,383,287 | * 5/1968 | Jackson | 376/352 |
| 3,613,936 | * 10/1971 | Kaiser et al. | 138/89 |
| 4,032,398 | * 6/1977 | Cross et al. | 376/352 |
| 4,168,071 | * 9/1979 | Jacobson et al. | 376/203 |
| 4,198,272 | * 4/1980 | Salmon | 376/203 |
| 4,356,147 | * 10/1982 | Borrman et al. | 376/291 |
| 4,576,400 | * 3/1986 | Allred et al. | 138/97 |
| 4,693,389 | * 9/1987 | Kalen | 326/203 |
| 4,834,935 | * 5/1989 | Daigle et al. | 376/282 |
| 5,173,009 | * 12/1992 | Moriarty | 138/97 |
| 5,345,484 | * 9/1994 | Deaver et al. | 376/204 |
| 5,737,380 | * 4/1998 | Deaver et al. | 376/282 |
| 5,785,361 | * 7/1998 | Bourbour et al. | 376/204 |
| 5,815,542 | * 9/1998 | Wistuba et al. | 376/280 |
| 5,839,192 | * 11/1998 | Weems et al. | 29/890.031 |
| 5,901,192 | * 5/1999 | Deaver et al. | 376/282 |
| 5,912,936 | * 6/1999 | Charnley et al. | 376/282 |
| 5,947,529 | * 9/1999 | Jensen | 376/282 |

FOREIGN PATENT DOCUMENTS

| | | | | |
|---|---|---|---|---|
| 2829590 | * | 1/1980 | (DE) | 376/352 |
| 387777 | * | 2/1933 | (GB) | 138/89 |

* cited by examiner

*Primary Examiner*—Harvey E. Behrend
(74) *Attorney, Agent, or Firm*—Armstrong Teasale LLP

(57) ABSTRACT

A T-box assembly to facilitate attaching a core spray line to a reactor core spray nozzle safe end without welding is described. In one embodiment, the T-box assembly includes a T-box housing, a cruciform wedge, and a draw bolt. The T-box housing is configured to be positioned so that a first end is located inside a core spray nozzle and engages the core spray nozzle safe end. Two other ends are configured to be in substantial alignment and configured to couple to core spray line header pipes. The T-box housing also includes a cover opening configured to receive a T-box cover plate. The T-box cover plate includes a draw bolt opening configured to receive the draw bolt. The first end of the T-box also includes a plurality of positioning lugs configured to engage the core spray nozzle to center the T-box housing in the nozzle bore. The cruciform wedge includes four web members extending from a central member and configured so as to form an X shaped configuration. Two support members extend between the ends of adjacent web members and are configured to conform to the bore of the core spray nozzle safe end. The draw bolt is configured to extend through a cruciform wedge bore and the draw bolt opening in the T-box cover plate and to threadenly engage a draw bolt nut.

12 Claims, 2 Drawing Sheets

CORE SPRAY UPPER T-BOX TO REACTOR VESSEL ATTACHMENT

BACKGROUND OF THE INVENTION

This invention relates generally to nuclear reactors and more particularly, to assemblies and methods for coupling core spray line assemblies within such reactors.

A reactor pressure vessel (RPV) of a boiling water reactor (BWR) typically has a generally cylindrical shape and is closed at both ends, e.g., by a bottom head and a removable top head. A core shroud, or shroud, typically surrounds the core and is supported by a shroud support structure.

Boiling water reactors have numerous piping systems, and such piping systems are utilized, for example, to transport water throughout the RPV. For example, core spray piping is used to deliver water from outside the RPV to core spargers inside the RPV and to cool the core. Typically, the core spray piping is coupled to a thermal sleeve which is welded to a RPV nozzle, or safe end.

Stress corrosion cracking (SCC) is a known phenomenon occurring in reactor components, such as structural members, piping, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to SCC.

Reactor internal piping, such as thermal sleeves and core spray lines, occasionally requires replacement as a result of SCC. Replacing the core spray piping often requires removing the core spray line from the RPV safe end. Because the spray line is welded to the safe end, removing the spray line from the safe end often damages, or breaks, the safe end. To replace the safe end, the reactor must be drained to an elevation below that of the safe end. The safe end is then cut off and a replacement is welded to the RPV. Thereafter, the replacement core spray line is welded to the replacement safe end. Replacing a safe end is time consuming and tedious.

It would be desirable to provide an assembly which facilitates replacing core spray lines without removing the reactor pressure vessel safe end. It also would be desirable to provide such an assembly which is easily removed and installed without the necessity of welding.

BRIEF SUMMARY OF THE INVENTION

These and other objects may be attained by a T-box assembly which facilitates attaching a core spray line to a reactor core spray nozzle safe end without welding. In one embodiment, the T-box assembly includes a T-box housing, a cruciform wedge, and a draw bolt. The T-box housing includes three ends, and is configured to be positioned so that a first end is located inside a core spray nozzle and engages the core spray nozzle safe end. The other two ends are configured to be in substantial alignment with each other and couple to core spray line header pipes. The T-box housing also includes a cover opening that is in substantial alignment with the first end, and receives a T-box cover plate. The T-box cover plate includes a draw bolt opening for receiving the draw bolt. The first end of the T-box also includes a plurality of positioning lugs configured to engage the core spray nozzle to center the T-box housing in the nozzle bore.

The cruciform wedge includes a central member having a bore extending therethrough. Four web members extend from the central member. The web members are configured so as to form an X shaped configuration. Two support members extend between the ends of adjacent web members with a first support member extending between the first and second web members, and a second support member extending between the third and fourth web members. The support members engage the bore of the core spray nozzle safe end.

The draw bolt extends through the bore of the central member of the cruciform wedge. The draw bolt includes a cap portion located at one end configured to be larger than the diameter of the bore through the central member of the cruciform wedge. The opposite end of the draw bolt extends through the draw bolt opening in the T-box cover plate and threadedly engages a draw bolt nut. The draw bolt and cruciform wedge may have spherical mating surfaces to preclude bending of the draw bolt.

The T-box assembly is used to connect a core spray line to the safe end of a core spray nozzle by coupling the first end of the T-box housing to an end of the safe end and coupling the other two ends of the housing to core spray distribution header pipes. Particularly, to couple the first end of the T-box housing to the safe end, the cruciform wedge and draw bolt are inserted into the safe end bore. The cruciform wedge is configured with the webs in an X-shaped configuration and only two support member connecting web members to permit the wedge to be inserted into the safe end bore. The wedge is inserted in an orientation that positions the axis of the bore of the cental member of the wedge perpendicular to the bore of the nozzle safe end. The wedge is then tilted so as to move the central member bore into co-axial alignment with the safe end bore with the support members engaging the inside surface of the safe end bore. The draw bolt is then inserted through the bore of the wedge central member with the threaded end of the draw bolt extending away from the safe end and towards the T-box housing.

The T-box housing is then positioned with the alignment lugs engaging the inside surface of the core spray nozzle and the first end of the housing engaging the end of the safe end. The T-box cover plate is positioned over the cover opening with the threaded end of the draw bolt extending through the draw bolt opening in the cover plate. The draw bolt nut is then threaded onto the bolt and tightened to a predetermined torque. The core spray header pipes are coupled to the other two ends of the T-box housing to complete the installation.

The above described T-box assembly facilitates replacing the core spray line without removing the core spray nozzle safe end or draining the reactor. In addition, the T-box assembly facilitates attaching the core spray line to the safe end without welding.

DETAILED DESCRIPTION OF THE INVENTION

Figure 1:
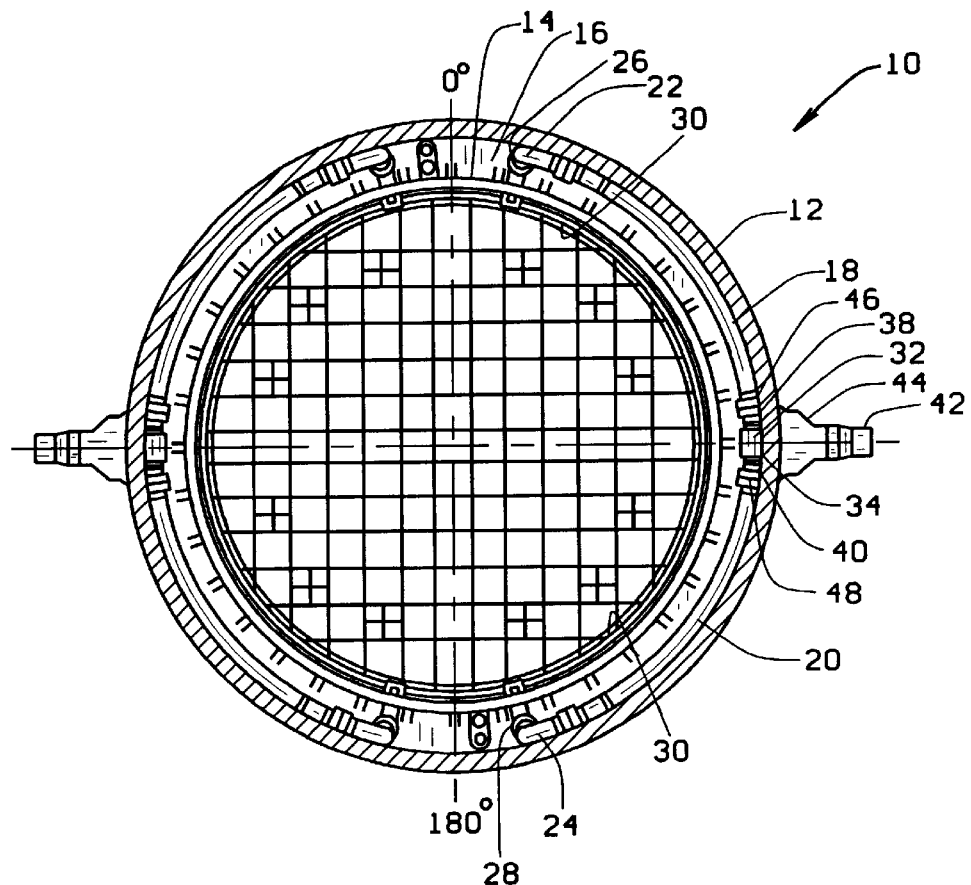
FIG. 1 is a top sectional view of a boiling water nuclear reactor pressure vessel illustrating a T-box assembly in accordance with one embodiment of the present invention.

FIG. 1 is a top sectional view of a boiling water nuclear reactor pressure vessel 10. Reactor pressure vessel 10 includes a vessel wall 12 and a shroud 14 which surrounds the reactor core (not shown) of pressure vessel 10. An annulus 16 is formed between vessel wall 12 and shroud 14. The space inside annulus 16 is limited with most reactor support piping located inside annulus 16.

Cooling water is delivered to the reactor core during a loss of coolant accident through core spray distribution header pipes 18 and 20 which are connected to downcomer pipes 22 and 24 respectively. Downcomer pipes 22 and 24 are connected to shroud 14 through lower T-boxes 26 and 28 respectively, which are attached to shroud 14 and internal spargers 30.

Distribution header pipes 18 and 20 diverge from an upper T-box assembly 32. Particularly, T-box 32 includes, in one embodiment, a T-box housing 34 having first, second, and third ends 36 (shown in FIG. 2), 38, and 40. First end 36 of T-box housing 34 is coupled to a safe end 42 of core spray nozzle 44. Ends 38 and 40 are configured to be in substantial alignment and configured to couple to core spray line header pipes 18 and 20 respectively. Header pipes 18 and 20 are coupled to second and third ends 38 and 40 by pipe connectors 46 and 48 respectively. Pipe connectors 46 and 48 may be any pipe connectors known in the art, but preferably, are pipe connectors such as described in co-pending U.S. patent application Ser. No. 08/909,283, entitled PIPE CONNECTOR ASSEMBLY, filed Aug. 11, 1997, and assigned to the present assignee.

Figure 2:
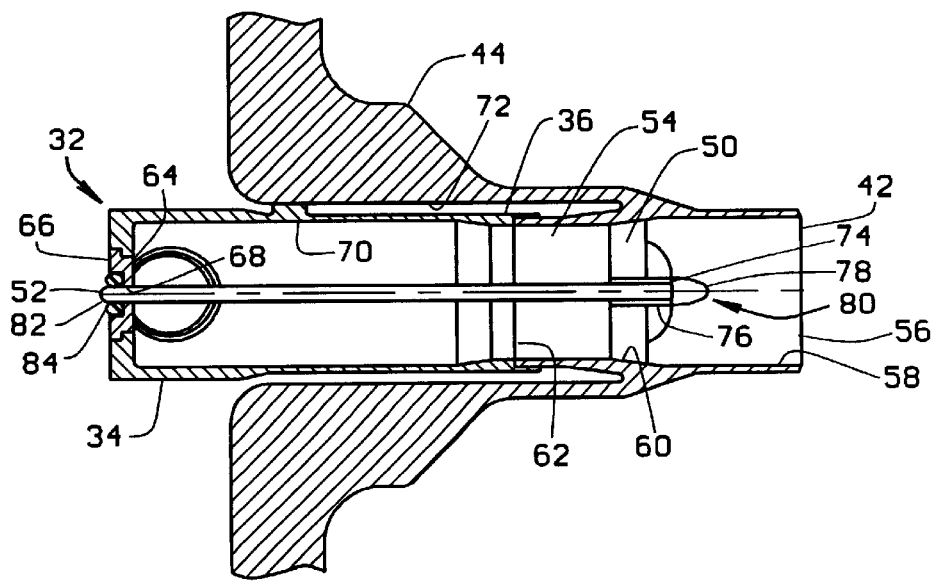
FIG. 2 is a sectional side view with parts cut away of the T-box assembly shown in FIG. 1.

FIG. 2 is a sectional side view with parts cut away of T-box assembly 32. In one embodiment, T-box assembly 32 includes in addition to T-box housing 34, a cruciform wedge 50 and a draw bolt 52.

T-box housing 34 is configured to be positioned so that first end 36 is located inside core spray nozzle 44 and engages core spray nozzle safe end 42. Particularly, safe end 42 includes a first end 54, a second end 56, and a bore 58 extending between ends 54 and 56. Bore 58 includes a tapered portion 60 located between ends 54 and 56. First end 36 of T-box housing 34 engages core spray nozzle safe end 42 at first end 54 forming a metal-to-metal interface 62.

T-box housing 34 also includes a cover opening 64 that is in substantial alignment with first end 36, and is configured to receive a T-box cover plate 66. T-box cover plate 66 includes a draw bolt opening 68 configured to receive draw bolt 52. First end 36 of T-box housing 34 also includes a plurality of positioning lugs 70 (one shown) configured to engage core spray nozzle 44 to center T-box housing 34 in core spray nozzle bore 72.

Draw bolt 52 is configured to extend through a bore 74 of a central member 76 of cruciform wedge 50. Draw bolt 52 comprises a cap portion 78 located at a first end 80 configured to be larger than the diameter of bore 74 through central member 76 of cruciform wedge 50. A second end 82 of draw bolt 52 is configured to extend through draw bolt opening 68 in T-box cover plate 66 and to threadenly engage a draw bolt nut 84.

Figure 3:
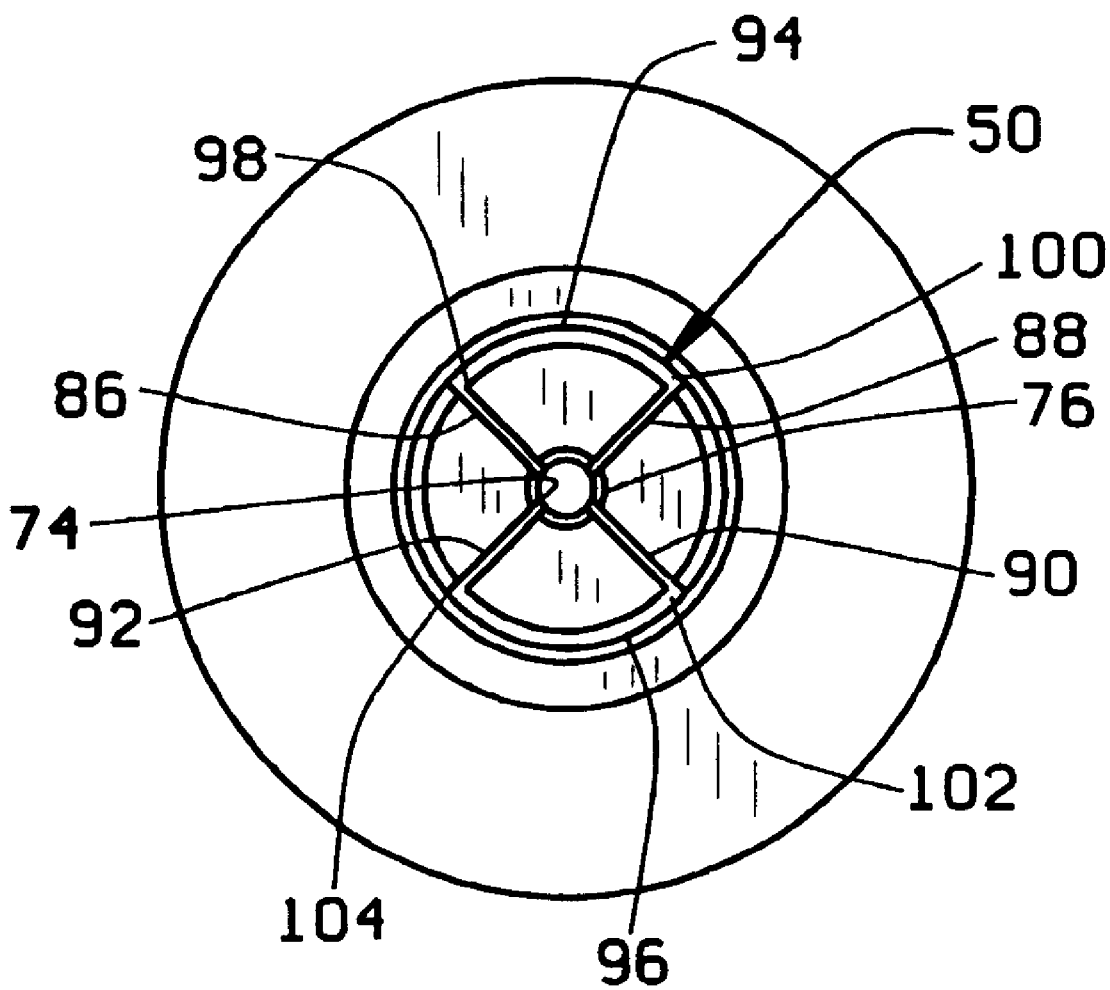
FIG. 3 is a front view of the T-box assembly shown in FIG. 1.

Referring to FIG. 3, cruciform wedge 50 includes central member 76 having bore 74 extending therethrough. First, second, third and fourth web members 86, 88, 90, and 92 extend from central member 76. Web members 86, 88, 90, and 92 are configured so as to form an X shaped configuration. Support members 94 and 96 extend between ends 98, 100, 102, and 104 of adjacent web members 86, 88, 90, and 92. Particularly, support member 94 extends between first and second web members 86 and 88, and support member 96 extends between third and fourth web members 90 and 92. Support members 94 and 96 are configured to conform to bore 58 of core spray nozzle safe end 42. Particularly support members 94 and 96 are configured to engage tapered portion 60 of safe end bore 58 (shown in FIG. 2). Additionally, web members 86, 88, 90, and 92 are configured to be contoured to minimize flow resistance.

To replace a core spray line in nuclear reactor pressure vessel 10, the existing T-box/thermal sleeve combination is removed from core spray nozzle safe end 42 by conventional underwater plasma arc cutting and/or electric discharge machining (EDM). Typically, a small portion of end 54 of safe end 42 is also removed. First end 54 is then prepared, usually by EDM, to mate with first end 36 of T-box housing 34. Particularly, first end 54 of safe end 42 is machined so as to form a metal-to-metal interface 62 with first end 36 of T-box housing 34.

T-box assembly 32 is used to connect core spray lines 18 and 20 to safe end 42 of core spray nozzle 44 by coupling first end 36 of T-box housing 34 to safe end 42 and coupling ends 38 and 40 to core spray distribution header pipes 18 and 20. Particularly, to couple first end 36 of the T-box housing 34 to safe end 42, cruciform wedge 50 and draw bolt 52 are inserted into safe end bore 58. Cruciform wedge 50 is configured with webs 86, 88, 90, and 92 in an X-shaped configuration and only two support members 94 and 96 connecting web members 86, 88, 90, and 92 to permit wedge 50 to be inserted into safe end bore 58. Wedge 50 is inserted in an orientation that positions the axis of bore 74 of central member 76 of wedge 50 perpendicular to the axis of bore 58 of nozzle safe end 42. Wedge 50 is then tilted so as to move central member bore 74 into co-axial alignment with safe end bore 58, and support members 94 and 96 into engagement with tapered portion 60 of safe end bore 58.

Draw bolt 52 is then inserted through bore 74 of wedge central member 76 with threaded end 82 of draw bolt 52 extending away from safe end 42 and towards T-box housing 34. This may be accomplished by attaching a thin wire (not shown) to threaded end 82 of bolt 52 and threading the wire through wedge central member bore 74 before inserting wedge 50 and draw bolt 52 into safe end 42. After wedge 50 has been tilted to its operational position the wire may be pulled through central member bore 74 which in turn pulls threaded end 82 of draw bolt 52 through wedge bore 74 and into position with cap portion 78 of bolt 52 engaging central member 76 of wedge 50.

T-box housing 34 is then positioned with the alignment lugs 70 engaging the inside surface of core spray nozzle 44 and first end 36 of housing 34 engaging first end 54 of safe end 42. T-box cover plate 66 is then positioned over cover opening 64 with threaded end 82 of draw bolt 52 extending through draw bolt opening 68 in cover plate 66. Draw bolt nut 84 is then threaded onto bolt 52 and tightened to a predetermined torque. Core spray header pipes 18 and 20 are then coupled to ends 38 and 40 of T-box housing 34 to complete the installation.

The above described T-box assembly 32 facilitates replacing core spray lines 18 and 20 without removing core spray nozzle safe end 42 or draining reactor 10. In addition T-box assembly 32 facilitates attaching core spray lines 18 and 20 to safe end 42 without welding.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A T-box assembly for attachment to a core spray nozzle safe end in a boiling water nuclear reactor pressure vessel, the safe end including a first end and a second end and a bore extending from the first end to the second end of the safe end, said T-box assembly comprising:
   a T-box housing configured to engage the first end of the core spray nozzle safe end;
   a cruciform wedge configured to engage a surface of the bore of the core spray nozzle safe end; and
   a draw bolt coupled to said cruciform wedge, said cruciform wedge comprising:
      a central member having a bore therethrough;
      a first, a second, a third, and a fourth web member extending from said central member, said web members configured so as to form an X shaped configuration;
      a first support member extending between first ends of said first and second web members; and
      a second support member extending between first ends of said third and fourth web members, said first and second support members configured to engage the bore of the safe end, an area extending between said first ends of said second and third web member, and an area between said first ends of said fourth and said first web members being free of support members.

2. An assembly in accordance with claim 1 further comprising a T-box cover plate configured to couple to said T-box housing, said cover plate comprising a draw bolt opening configured to accept said draw bolt to couple said cruciform wedge to said T-box housing.

3. An assembly in accordance with claim 2 wherein said T-box housing comprises a first end, a second end, a third end, and a cover opening, said first and second ends configured to be in substantial alignment and to couple to a first and a second core spray header pipe respectively, said third end configured to be positioned in a bore of the core spray nozzle and engage the first end of the core spray nozzle safe end, and said cover opening configured to be in substantial alignment with said third end of said T-box housing and to receive said T-box cover plate.

4. An assembly in accordance with claim 3 wherein said third end of said T-box housing further comprises a plurality of positioning lugs configured to engage the core spray nozzle to center said T-box housing in the nozzle bore.

5. An assembly in accordance with claim 1 wherein said draw bolt is configured to extend through said bore of said central member of said cruciform wedge, said draw bolt comprising a first end and a second end, said first end comprising a cap portion configured to be larger than the diameter of said bore through said central member of said cruciform wedge, said second end configured to extend through said draw bolt opening in said T-box cover plate and to threadenly engage a draw bolt nut.

6. An assembly in accordance with claim 5 wherein said web members of said cruciform wedge are configured to be contoured to minimize flow resistance.

7. A core spray line assembly for a reactor pressure vessel in a nuclear reactor, said core spray line assembly comprising:
   a core spray nozzle safe end comprising a first end, a second end, and a bore extending between said first and second ends; and
   a T-box assembly configured to couple to said safe end, said T-box assembly comprising a T-box housing configured to engage said first end of said core spray nozzle safe end, a cruciform wedge configured to engage a surface of said bore of said core spray nozzle safe end, and a draw bolt coupled to said cruciform wedge, said cruciform wedge comprising:
      a central member having a bore therethrough; a first, a second, a third, and a fourth web member extending from said central member, said web members configured so as to form an X shaped configuration;
      a first support member extending between first ends of said first and second web members; and
      a second support member extending between first ends of said third and fourth web members, said first and second support members configured to engage said bore of said safe end, an area extending between said first ends of said second and third web member, and an area between said first ends of said fourth and said first web members being free of support members.

8. A core spray line assembly in accordance with claim 7 wherein said T-box assembly further comprises a T-box cover plate configured to couple to said T-box housing, said cover plate comprising a draw bolt opening configured to accept said draw bolt to couple said cruciform wedge to said T-box housing.

9. A core spray line assembly in accordance with claim 8 wherein said T-box housing comprises a first end, a second end, a third end, and a cover opening, said first and second ends configured to be in substantial alignment and to couple to a first and a second core spray header pipe respectively, said third end configured to be positioned in a bore of the core spray nozzle and engage said first end of said core spray nozzle safe end, and said cover opening configured to be in substantial alignment with said third end of said T-box housing and to receive said T-box cover plate.

10. A core spray line assembly in accordance with claim 9 wherein said third end of said T-box housing further comprises a plurality of positioning lugs configured to engage said core spray nozzle to center said T-box housing in aid nozzle bore.

11. A core spray line assembly in accordance with claim 7 wherein said draw bolt is configured to extend through said bore of said central member of said cruciform wedge, said draw bolt comprising a first end and a second end, said first end comprising a cap portion configured to be larger than the diameter of said bore through said central member of said cruciform wedge, said second end configured to extend through said draw bolt opening in said T-box cover plate and to threadenly engage a draw bolt nut.

12. A core spray line assembly in accordance with claim 11 wherein said web members of said cruciform wedge are configured to be contoured to minimize flow resistance.

* * * * *

UNITED STATES PATENT AND TRADEMARK OFFICE
CERTIFICATE OF CORRECTION

PATENT NO. : 6,201,847 B1
DATED : March 13, 2001
INVENTOR(S) : Grant Clark Jensen et al.

It is certified that error appears in the above-identified patent and that said Letters Patent is hereby corrected as shown below:

Column 6, claim 10,
Line 46, delete "aid" and substitute -- said --.

Signed and Sealed this

Eleventh Day of December, 2001

Attest:

*Nicholas P. Godici*

NICHOLAS P. GODICI
*Attesting Officer*    *Acting Director of the United States Patent and Trademark Office*